United States Patent [19]

Iwagawa et al.

[11] Patent Number: 4,929,036
[45] Date of Patent: May 29, 1990

[54] HYDRAULIC BRAKE PRESSURE CONTROL DEVICE FOR A VEHICLE

[75] Inventors: Yoshihiro Iwagawa; Toshio Yahagi; Etsuo Fujii, all of Saitama, Japan

[73] Assignee: Honda Giken Kogyo Kabushiki Kaisha, Tokyo, Japan

[21] Appl. No.: 369,887

[22] Filed: Jun. 22, 1989

[30] Foreign Application Priority Data

Jun. 24, 1988 [JP] Japan .................................. 63-157088

[51] Int. Cl.$^5$ ............................................. B60T 8/42
[52] U.S. Cl. ...................................... 303/115; 303/92
[58] Field of Search ...................... 303/9.72, 9.75, 22.1, 303/22.8, 92, 113, 114, 115, 116, 117

[56] References Cited

U.S. PATENT DOCUMENTS

| 4,316,642 | 2/1982 | Belart ................................... 303/116 |
| 4,627,670 | 12/1986 | Matsuda et al. ..................... 303/115 |
| 4,664,451 | 5/1987 | Sakaguchi et al. ................ 303/9.75 |

Primary Examiner—Duane A. Reger
Attorney, Agent, or Firm—Armstrong, Nikaido, Marmelstein, Kubovcik & Murray

[57] ABSTRACT

A hydraulic brake pressure control device for a vehicle including a casing having first and second cylinder portions in coaxial arrangement and a pillar-like cylinder projecting portion which projects into the first cylinder portion. A piston is disposed in the casing having first and second piston portions which are connected together and slidably fitted in the first and second cylinder portions, repsectively. A third cylinder portion in the piston is slidably fitted around the projecting portion. A spring is provided in the casing urging the piston in one direction. A control chamber is defined in the first cylinder portion and exerts, upon introduction of a liquid pressure thereinto, a pressing force onto the piston in the opposite direction. An input hydraulic pressure chamber is defined within the first and second cylinder portions to apply a pressing force to the piston in the one direction with a hydraulic pressure introduced thereinto and an output hydraulic pressure chamber is further defined in the third cylinder portion for exerting a pressing force to the piston in the opposite direction with an introduced hydraulic pressure. An oil passage is in the piston for communicating the input and output hydraulic pressure chambers. A valve mechanism is provided for closing the passage in response to movement of the piston in the opposite direction. This allows the pressure receiving area of the piston exposed to the input chamber to be easily made small irrespective of the provision of the valve mechanism, improving the piston responsiveness and making the whole device compact.

5 Claims, 1 Drawing Sheet

HYDRAULIC BRAKE PRESSURE CONTROL DEVICE FOR A VEHICLE

BACKGROUND OF THE INVENTION

1. Field of the Invention

The present invention relates to a hydraulic brake pressure control device for a vehicle, and more particularly, to a hydraulic brake pressure control device for a vehicle comprising an input hydraulic pressure chamber in communication with an output port of a master cylinder, and an output hydraulic pressure chamber in communication with a wheel brake to generate a brake hydraulic pressure corresponding to the hydraulic pressure in the input hydraulic pressure chamber, wherein when the wheel tends to assume a locked state, a volume of the output hydraulic pressure chamber increases in response to introduction, of controlled liquid pressure from anti-lock control means into a control chamber.

2. Description of the Prior Art

In the past, in such a hydraulic brake pressure control device for a vehicle as described above, a piston is actuated in response to hydraulic pressure of the input hydraulic pressure chamber to reduce the volume of the output hydraulic pressure chamber, whereby brake hydraulic pressure corresponding to the input hydraulic pressure chamber is generated from the output hydraulic pressure chamber. During the anti-lock controlling, the piston is actuated in the direction opposite to that previously mentioned by controlled liquid pressure supplied to the control chamber to increase the volume of the output hydraulic pressure chamber.

In such a hydraulic brake pressure control device as described above, a brake hydraulic pressure system is divided into a system from a master cylinder to an input hydraulic pressure chamber and a system from a output hydraulic pressure chamber to a wheel brake, and accordingly, it has been necessary, in supplying working oil to the brake hydraulic pressure system, to fill the working oil into both systems. When the brake is being applied the piston is always operating, and the number of strokes thereof increases, thus deteriorating a durability in one aspect.

In view of the foregoing, the present applicant has proposed, as disclosed in, for example, Japanese Patent Application Laid-Open No. 27749/1986, a hydraulic brake pressure control device for a vehicle in which the brake hydraulic pressure system is unified from a master cylinder to a wheel brake to facilitate filling work of working oil And in order to improve a durability by reducing the number of strokes of the piston, a valve mechanism which is closed in response to movement of a piston during the anti-lock controlling is provided in a partitioning wall between an output hydraulic pressure chamber and an input hydraulic pressure chamber. In this hydraulic brake pressure control device, the aforesaid piston has a first piston defining an input hydraulic pressure chamber and a control chamber and a second piston defining an output hydraulic pressure chamber connected by a piston rod which liquid-tightly and slidably extends through the partitioning wall. According to the hydraulic brake pressure control device as described above, the above-described problems were solved. Generally, the hydraulic brake pressure control device as described above requires that when the wheel is about to assume a locked state during braking, the brake hydraulic pressure is immediately reduced. That is, the responsiveness is good. In order to further improve the responsiveness of the brake pressure control device for a vehicle, as disclosed in the aforementioned publication, it is necessary for the piston to quickly respond when the anti-lock control begins.

In order to respond to such a demand, in the hydraulic brake pressure control device, brake hydraulic pressure of the input hydraulic pressure chamber is exerted as a back pressure on the first piston which receives the controlled liquid pressure of the control chamber. Therefore, a difference in exerting forces applied to the piston by these pressures has to be made as large as possible. It is contemplated that in order to make the exerting force large, a difference between pressure receiving areas of opposite ends of the first piston be increased or the controlled liquid pressure applied to the piston be increased.

In order to increase the difference in pressure receiving areas of the first piston, it is necessary to increase a sectional area of the piston rod since said difference is determined by the sectional area of the piston rod. That is, the diameter of the piston rod need be made large. However, since the valve mechanism is disposed in the partitioning wall, when the diameter of the piston rod is made large, the piston rod interferes with the valve mechanism, and the diameter of the piston rod cannot be made so large. If an attempt is made to forcibly increase the diameter of the piston rod, the valve mechanism has to be provided in a direction further away from the center of the piston rod, and therefore the whole hydraulic brake pressure control device becomes large-sized.

As described above, there is a limit to increase a difference in pressure receiving areas of the opposite ends of the first piston.

On the other hand, in order to increase the controlled liquid pressure, it is necessary to increase the capacity of a hydraulic pressure pump which generates the controlled liquid pressure. However, when the capacity of the hydraulic pressure pump is increased, not only the energy consumption becomes increased but also the whole hydraulic brake pressure control device becomes large-sized.

SUMMARY OF THE INVENTION

The present invention has been achieved in view of the foregoing. An object of the present invention is to provide a hydraulic brake pressure control device for a vehicle which can be made compact, while further improving a responsiveness, and can avoid an increase of energy consumption.

For achieving the aforementioned object, according to the present invention, there is provided a hydraulic brake pressure control device for a vehicle, comprising a casing which includes therein a first cylinder portion, a second cylinder portion in coaxial arrangement with the first cylinder portion and a pillar-like projecting portion which projects into the first cylinder portion, the casing receiving therein a piston comprising a first piston portion slidably fitted in the first cylinder portion, a second piston portion connected to the first piston portion and slidably fitted in the second cylinder portion and a third cylinder portion positioned in the center of the first piston and slidably fitted over the projecting portion, and a spring for urging the piston in one direction. The first cylinder portion defines therein the control chamber for exerting a pressing force on the piston in the opposite direction upon introduction of a liquid pressure. The first and second portions defines therein the input hydraulic pressure chamber for exerting a pressing force on the piston in the one direction upon introduction of hydraulic pressure. The third cylinder portion defines therein the output hydraulic pressure chamber for exerting a pressing force on the piston in the opposite direction upon introduction of hydraulic pressure. The piston is provided with an oil passage for communicating the input and output hydraulic pressure chambers and a valve mechanism for closing the oil passage in response to movement of the piston in the opposite direction.

According to the above-described structure, the pressure receiving area of the piston facing the input hydraulic pressure chamber can be easily set small irrespective of the valve mechanism, the responsiveness of the piston can be improved, the whole control device can be made compact, and the energy consumption can be decreased.

Further, if in addition to the above-described structure, the pressure receiving area facing the control chamber of the piston is set larger than that facing the input hydraulic pressure chamber, the force of controlled liquid pressure of the control chamber applied to the piston when the anti-lock control starts can promptly exceed the force of hydraulic pressure of the input hydraulic pressure chamber, and a further improvement in responsiveness of the piston can be expected.

Moreover, if in addition to the above-described structure, the pressure receiving area facing the input hydraulic pressure chamber of the piston is set larger than that facing the output hydraulic pressure chamber, the force of hydraulic pressure of the input hydraulic pressure chamber applied to the piston during normal braking always becomes larger than that of hydraulic pressure of the output hydraulic pressure chamber. Accordingly, it is possible to prevent the valve mechanism from being closed by movement of the piston in the opposite direction due to the hydraulic pressure of the output hydraulic pressure chamber to positively effect braking. In addition since it is sufficient for the spring to have a small set load, the control force for actuating the piston against the force of the spring during the anti-lock control will suffice to be relatively small, thus contributing to the improvement in responsiveness of the piston.

The above and other objects, features and advantages of the present invention will become apparent from the ensuing detailed description of the preferred embodiments in connection with the accompanying drawings.

BRIEF DESCRIPTION OF THE DRAWINGS

FIG. is a longitudinal sectional view showing one embodiment of a hydraulic brake pressure control device for a vehicle according to the present invention.

DESCRIPTION OF THE PREFERRED EMBODIMENTS

One embodiment of the present invention will be described herein after with reference to the drawings.

Figure 1:
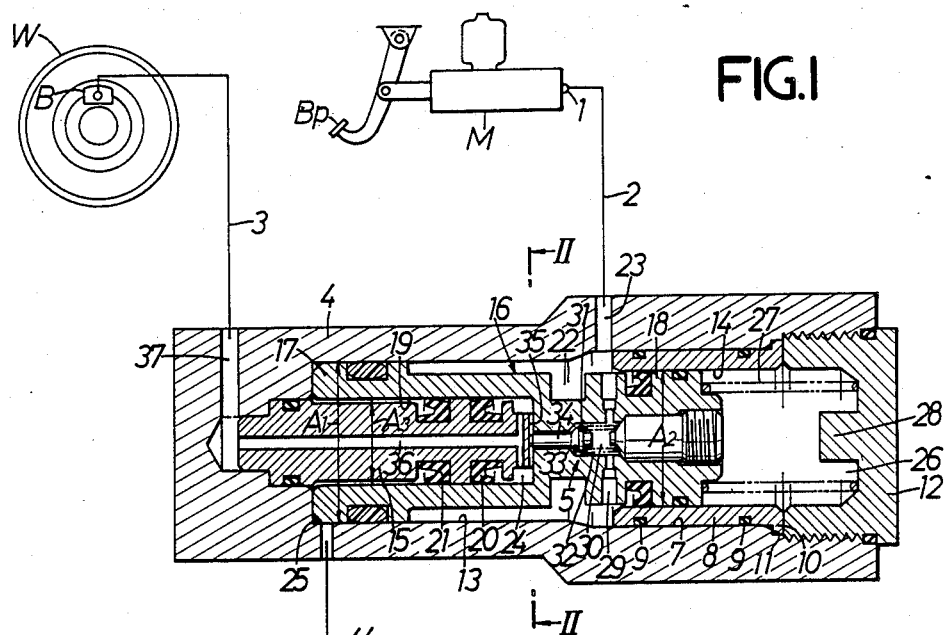

As shown in FIG. 1, a casing 4 is provided between an oil passage 2 extending from an output port 1 of a master cylinder M and an oil passage 3 in communication with a wheel brake B mounted on a wheel W. A valve mechanism 5 provided within the casing 4 has the function of transmitting brake hydraulic pressure from the master cylinder M to the wheel brake B when braking operation, and the function in which when the wheel W is about to assume a locked state, the valve is closed by an anti-lock control liquid pressure supplied from an anti-lock control means 6 to cutoff a supply of the brake hydraulic pressure from the master cylinder M to the wheel B.

A casing 4 is bored with a hole 7 one end of which is open. A cylindrical member 8 is fitted in the hole 7 with an O-ring 9 disposed on the inner surface of the hole 7. In this case, the cylindrical member 8 is fitted till a flange portion 10 at one end thereof comes into contact with a shoulder 11 provided facing the open end of the hole 7. A cap 12 is threadedly engaged with the open end of the hole 7, the cap 12 being brought into contact with the flange portion 10 of the cylindrical member 8 and being fastened till the cylindrical member 8 is urged against the shoulder 11. In this manner, a first cylinder portion 13 and a second cylinder portion 14 are coaxially formed in the casing 4. Within the first cylinder portion 13, a pillar-like projecting portion 15 is disposed concentric with the first cylinder portion 13, the projecting portion 15 being secured to the casing 4.

The casing 4 includes therein a piston 16. This piston 16 is composed of a first piston portion 17 slidably fitted in the first cylinder portion 13, and a second piston portion 18 connected to the first piston portion 17 and slidably fitted in the second cylinder portion 14. A third cylinder portion 19, one end of which is opened, is provided on the first piston 17 side of the piston 16. The third cylinder portion 19 is fitted over the projecting portion 15 through seals 20 and 21.

An input hydraulic pressure chamber 22 is defined between the first piston portion 17 and the second piston portion 18. The input hydraulic pressure chamber 22 is communicated with the oil passage 2 through an inlet oil passage 23 formed in the side of the casing 4. Within the third cylinder portion 19, an output hydraulic pressure chamber 24 is defined by a fore end of the projecting portion 15 and the piston 16. Further, on the side opposite the input hydraulic pressure chamber 22 of the first piston portion 17 is defined a control chamber 25 by the end wall of the first cylinder portion 13, the first piston portion 17 and the projecting portion 15.

In this case, $A_1$ represents the sectional area of the first cylinder portion 13, $A_2$ the sectional area of the second cylinder portion 14 and $A_3$ the sectional area of the third cylinder portion 19, then pressure receiving areas ($A_1-A_3$) facing the control chamber 25 of the piston 16 are set larger than the pressure receiving areas ($A_1-A_2$) facing the input hydraulic pressure chamber 22 of the piston 16. The pressure receiving areas ($A_1-A_2$) facing the input hydraulic pressure chamber 22 of the piston 16 are set larger than the pressure receiving area $A_3$ facing the output hydraulic pressure chamber 24 of the piston 16.

On the side opposite the input hydraulic pressure chamber 22 of the second piston portion 18 is defined a spring chamber 26 by the second piston portion 18, the cylindrical member 8 and the cap 12. The interior of the spring chamber 26 is communicated with the exterior, and the spring chamber 26 incudes therein a spring 27 for continuously urging the piston 16 in one direction of the control chamber 25. Integrally mounted on the cap 12 is a stopper 28 for defining the amount of movement of the piston 16 to a predetermined value.

The input hydraulic pressure chamber 22 and the output hydraulic pressure chamber 24 are communicated by an oil passage 29 having a T-shaped section provided in the piston 16. The oil passage 29 is formed with a valve chamber 30, which in turn includes therein a valve body 31 and a small spring 32 for continuously urging the valve body 31 in a direction of closing it. On the end of the valve chamber 30 towards the output hydraulic pressure chamber 24 is provided a conical valve seat 33 which reduces in diameter toward the output hydraulic chamber 24. On the side opposite the small spring 32 of the valve body 31 is provided a valve driving rod 34 projected toward the output hydraulic pressure chamber 24. The length of the valve driving rod 34 is set to a sufficient value so that when the piston 16 is displaced toward the control chamber 25 and the valve driving rod 34 comes into contact with the fore end of the projecting portion 15, the small spring 32 is compressed, the valve body 31 is moved away from the valve seat 33 opening the valve and thereafter only the piston 16 is displaced toward the control chamber 25.

The above-mentioned valve chamber 30, the valve body 31, the small spring 32, the valve seat 33 and the valve driving rod 34 comprise the valve mechanism 5 of the present invention.

Figure 2:
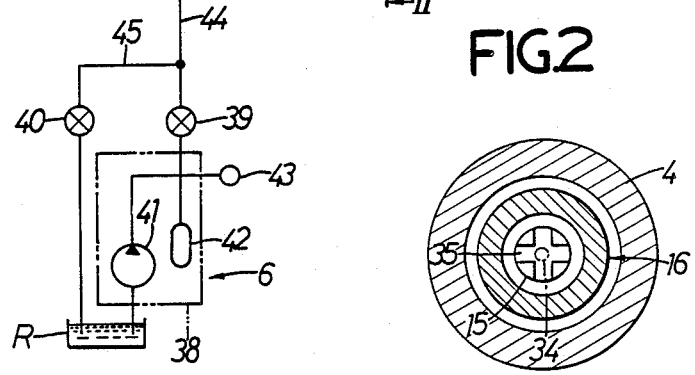
FIG. 2 is a sectional view taken on line II—II of FIG. 1.

The projecting portion 15 is formed at the fore end with a groove 35 so that when the bottom of the third cylinder portion 19 of the piston 16 is in contact with the fore end of the projecting portion 15, the input hydraulic pressure chamber 22 and the output hydraulic pressure chamber 24 are brought into positive communication with each other. As shown in FIG. 2, the groove 35 has a cross-shape, and the width of the groove 35 is set slightly larger than the diameter of the valve driving rod 34. The end of the valve driving rod 34 is in contact with the bottom surface of the cross portion of the groove 35.

On the other hand, the output hydraulic pressure chamber 24 is communicated with the wheel brake B through an oil passage 36 formed in the projecting portion 15, an outlet oil passage 37 formed in the casing 4, and the oil passage 3.

The anti-lock control means 6 comprises a liquid pressure source 38, a first electromagnetic valve 39 which is normally closed, and a second electromagnetic valve 40 which is normally open. The liquid pressure source 38 is composed of a hydraulic pressure pump 41 for pumping out a controlled liquid, for example, a hydraulic pressure oil, from an oil tank R, an accumulator 42, and a hydraulic pressure sensor 43 for detecting a trouble and failure in hydraulic pressure of the hydraulic pressure pump 41 and a start and stop of the hydraulic pressure pump 41.

The first electromagnetic valve 39 is provided in the midst of a supply oil passage 44 connecting the liquid pressure source 38 and the control chamber 25, and the second electromagnetic valve 40 is provided in the midst of a return oil passage 45 branched from the supply oil passage 44 and returned to the oil tank R between the first electromagnetic valve 39 and the control chamber 25. Accordingly, the control chamber 25 is normally communicated with the oil tank R.

Next, the operation of the above-described embodiment will be described. At the time of non-operation in which a brake pedal Bp is not operated, the piston 16 is displaced leftward till the bottom of the third cylinder portion 19 comes into contact with the fore end of the projecting portion 15 by the force of the spring 27. In the valve mechanism 5, the valve driving rod 34 is in contact with the fore end of the projecting portion 15 and the valve body 31 disengaged from the valve seat 33 and is open. Accordingly, there is formed a hydraulic pressure line from the output port 1 of the master cylinder M to the wheel brake B through the oil passage 2, the inlet oil passage 23, the input hydraulic pressure chamber 22, the oil passage 29, the valve mechanism 5, the groove 35, the output hydraulic pressure chamber 24, the oil passage 36, the outlet oil passage 37 and the oil passage 3. Thereby, the filling of working oil in the brake hydraulic pressure system can be very easily carried out in a manner similar to the brake hydraulic pressure device not provided with the valve mechanism 5 for the anti-lock control. That is, in the past, the filling of working oil had to be carried out by dividing the system into a hydraulic pressure line from the master cylinder M to the input hydraulic pressure chamber 22 and a hydraulic pressure line from the output hydraulic pressure chamber 24 to the wheel brake B, whereas since a direct brake hydraulic pressure line from the master cylinder M to the wheel brake B is established, working oil is filled from the master cylinder M side to thereby terminate filling of working oil to the wheel brake B.

When the braking operation is carried out by the brake pedal Bp, brake hydraulic pressure from the output port 1 of the master cylinder M is supplied to the wheel brake B via the hydraulic pressure line. At this time, in view of the relationship of $(A_1-A_2)>A_3$ as mentioned above, the force applied to the piston 16 by the hydraulic pressure of the input hydraulic pressure chamber 22 is greater than the force applied to the piston 16 by the hydraulic pressure of the output hydraulic pressure chamber 24, and therefore, a force in one direction toward the control chamber 25 is always to be applied to the piston 16. In addition, since the force of the spring 27 is also applied to the piston 16, the piston 16 is retained at the backward limit on the control chamber 25 side, and the valve mechanism 5 remains opened.

When at the time of brake operation, the brake force becomes excessively large and the wheel W is about to assume a locked state, the second electromagnetic valve 40 is closed and the first electromagnetic valve 39 is open. Therefore, the antilock control liquid pressure is supplied from the liquid pressure source 38 to the control chamber 25, and the piston 16 is forcibly moved rightward, that is, in the opposite direction against the operating force resulting from the spring 27 and the hydraulic pressure of the input hydraulic pressure chamber 22.

In this case, in view of the relationship of $(A_1-A_3)>(A_1-A_2)$ as mentioned above, the force toward the spring chamber 26 applied to the piston 16 by the controlled liquid pressure of the control chamber 25 immediately exceeds the force toward the control chamber 25 applied to the piston 16 by the hydraulic pressure of the input hydraulic pressure chamber 22. Particularly, the valve mechanism 5 is provided on the piston 16, and therefore, the pressure receiving area $(A_1-A_2)$ of input hydraulic pressure of the piston 16 can be set sufficiently small to provide a sufficiently large difference between the former and the pressure receiving area $(A_1-A_3)$ of controlled liquid pressure of the piston 16, without being obstructed by the presence of the valve mechanism 5. Accordingly, even if the liquid pressure introduced to the control chamber 25 is relatively low, the piston 16 receiving this can be immediately moved to fulfill the responsiveness and energy-saving.

As the piston 16 moves, the valve body 31 of the valve mechanism 5 becomes seated on the valve seat 33 and the valve mechanism is closed to discontinue a supply of brake hydraulic pressure to the wheel brake B. Thereby, entry of the wheel W into the locked state may be avoided anyhow, but when the wheel W is still about to lock, the liquid pressure of the control chamber 25 further increases and the piston 16 is further moved rightward. Therefore, the volume of the output hydraulic pressure chamber 24 increases, and the brake hydraulic pressure exerting on the wheel brake B decreases to positively prevent an entry of the wheel W into the locked state.

Assume now that the controlled liquid pressure of the control chamber 25 abnormally increases due to a failure of the anti-lock control means 6. Thereby, the piston 16 is displaced rightward while compressing the spring 27, and the volume of the output hydraulic pressure chamber 24 abnormally increases. In that case, pressure of the output hydraulic pressure chamber 24 tends to become negative but the piston 16 impinges upon the stopper 28 to impede further rightward movement thereof, and therefore, the increase in volume of the output hydraulic chamber 24 is limited to predetermined amount. Accordingly, the pressure in the output hydraulic pressure chamber 24 is prevented from being lowered to a negative pressure which poses a practical problem.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A hydraulic brake pressure control device for a vehicle comprising an input hydraulic pressure chamber in communication with an output port of a master cylinder, and an output hydraulic pressure chamber in communication with a wheel brake to generate a brake hydraulic pressure corresponding to a hydraulic pressure of the input hydraulic pressure chamber, in which when the wheel is about to assume a locked state, a volume of said output hydraulic pressure chamber increases in response to an introduction of a controlled liquid pressure from anti-lock control means to a control chamber, the hydraulic brake pressure control device comprising a casing which includes therein a first cylinder portion, a second cylinder portion in coaxial arrangement with said first cylinder portion and a pillar-like projecting portion which projects into said first cylinder portion, said casing receiving therein a piston comprising a first piston portion slidably fitted in said first cylinder portion, a second piston portion connected to the first piston portion and slidably fitted in said second cylinder portion and a third cylinder portion positioned in the center of said first piston portion and slidably fitted over said projecting portion, and a spring for urging the piston in one direction, said first cylinder portion defining therein said control chamber for exerting a pressing force on said piston in the opposite direction upon introduction of liquid pressure, said first and second cylinder portions defining therein said input hydraulic pressure chamber for exerting a pressing force on said piston in said one direction upon introduction of hydraulic pressure, said third cylinder portion defining therein said output hydraulic pressure chamber for exerting a pressing force on said piston in the opposite direction upon introduction of hydraulic pressure, said piston being provided with an oil passage for communicating the input and output hydraulic pressure chambers and a valve mechanism for closing the oil passage in response to movement of the piston in the opposite direction.

2. A hydraulic brake pressure control device for a vehicle according to claim 1, wherein a pressure receiving area of said piston, facing said control chamber is set larger than that facing said input hydraulic pressure chamber.

3. A hydraulic brake pressure control device for a vehicle according to claim 1 or 2, wherein a pressure receiving area of said piston, facing said input hydraulic pressure chamber is set larger than that facing said output hydraulic pressure chamber.

4. A hydraulic brake pressure control device for a vehicle according to claim 1, wherein said valve mechanism comprises a valve chamber formed in said oil passage, a valve body received in said valve chamber, a small spring for continuously urging said valve body in a direction of closing it, a valve seat provided on an end surface of the valve chamber at the side of said output hydraulic pressure chamber, and a valve driving rod projected into said output hydraulic pressure chamber and provided on said valve body so as to be capable of contacting said projecting portion.

5. A hydraulic brake pressure control device for a vehicle according to claim 4, wherein a length of said valve driving rod is set to a sufficient value so that said small spring is compressed to maintain said valve body at a position away from said valve seat when said piston is displaced in said one direction and said valve driving rod is in contact with said projecting portion in a state wherein a controlled liquid pressure is not introduced into said control chamber.

* * * * *